(12) United States Patent
Shimada et al.

(10) Patent No.: US 6,271,283 B1
(45) Date of Patent: Aug. 7, 2001

(54) AQUEOUS ANTIFOULING COMPOSITION, PROCESS FOR ITS PRODUCTION AND PRODUCT TREATED THEREWITH

(75) Inventors: Toyomichi Shimada; Yuichi Omori; Takashige Maekawa, all of Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/383,399

(22) Filed: Aug. 26, 1999

(30) Foreign Application Priority Data

Aug. 31, 1998 (JP) .................................... 10-246103
Jun. 29, 1999 (JP) .................................... 11-184310

(51) Int. Cl.$^7$ ................................ C08K 5/56; C08L 27/12
(52) U.S. Cl. .......................... 523/122; 524/544; 428/422
(58) Field of Search ............................. 524/544; 523/122; 428/422

(56) References Cited

U.S. PATENT DOCUMENTS

| 3,491,169 | 1/1970 | Raynolds et al. . | |
|---|---|---|---|
| 4,859,754 | 8/1989 | Maekawa et al. | 526/245 |
| 5,100,954 | 3/1992 | Itoh et al. | 524/805 |
| 5,565,607 | 10/1996 | Maekawa et al. | 560/223 |
| 5,646,222 | 7/1997 | Maekawa et al. | 526/243 |

FOREIGN PATENT DOCUMENTS

| 0 473 148 | 3/1992 | (EP) . |
| 0 552 630 | 7/1993 | (EP) . |
| 2 074 828 | 10/1971 | (FR) . |
| 4-106180 | 4/1992 | (JP) . |

*Primary Examiner*—Kriellion Sanders
(74) *Attorney, Agent, or Firm*—Oblon, Spivak, McClelland, Maier & Neustadt, P.C.

(57) ABSTRACT

An aqueous antifouling composition comprising fine particles of a copolymer which comprises the following polymer units (a), (b) and (c) and which has a glass transition temperature of at most 5° C., and an aqueous medium in which the fine particles are dispersed:

(a) polymer units of a (meth)acrylate having a polyfluoroalkyl group, (b) polymer units of an alkyl acrylate wherein the carbon number of the alkyl group is from 2 to 12, and (c) polymer units of a (meth)acrylic monoester of a polyol.

11 Claims, No Drawings

AQUEOUS ANTIFOULING COMPOSITION, PROCESS FOR ITS PRODUCTION AND PRODUCT TREATED THEREWITH

The present invention relates to an aqueous antifouling composition which is capable of imparting an antifouling property excellent in durability to a substrate even when dried at room temperature, a process for its production and a product treated therewith.

Heretofore, an antifouling composition of a fluorine type has been used for antifouling purposes for fiber products such as working wears or rental sheets. A typical antifouling composition may be an antifouling composition having a copolymer obtained by copolymerizing an addition polymerizable monomer having a perfluoroalkyl group, dissolved in an organic solvent. As such an organic solvent, a halogen type solvent such as a chlorofluorocarbon or a hydrochlorocarbon has been used. However, with a view to protecting the ozone layer, such a halogen type solvent has been substituted by a ketone type solvent, an ester type solvent or a petroleum type solvent, in recent years. Further, conventional organic solvent type antifouling compositions including a case where a halogen type solvent has been used, used to have a problem such that the antifouling property tends to deteriorate by a few times of washing or dry cleaning or by abrasion during the use. Furthermore, antifouling compositions employing such organic solvents, have had a problem such that they had strong odors, or they are inflammable.

On the other hand, also known is an aqueous type antifouling composition which contains no or little organic solvent, such as a water and oil repellant (JP-A-6-240239) having dispersed in an aqueous medium a copolymer obtained by polymerizing a (meth)acrylate having a polyfluoroalkyl group, a blocked isocyanate group-containing (meth)acrylate and a hydroxyl group-containing (meth)acrylate, or an antifouling agent (JP-A-7-279687) having dispersed in an aqueous medium a copolymer obtained by polymerizing a (meth)acrylate having a polyfluoroalkyl group, a blocked isocyanate group-containing (meth)acrylate and a polyoxyalkylene chain-containing (meth)acrylate.

In this specification, the term "(meth)acrylate" means acrylate and/or methacrylate. The same applies to a term such as "(meth)acrylic acid". Further, "antifouling agent" is meant also for a water and oil repellant and may be one which imparts water and oil repellency to a substrate to provide an antifouling property.

Such an aqueous antifouling composition is superior in that it has overcome the drawbacks of an organic solvent type antifouling composition, but it is a cross-linkable antifouling agent and is required to be subjected to heat treatment for crosslinking in order to treat a substrate. However, in some cases such as a case where antifouling treatment is carried out simply at home or at office, it may be difficult to carry out such heat treatment. If a substrate is treated with such an aqueous antifouling composition and dried at room temperature, no adequate antifouling property will be obtained.

It is an object of the present invention to provide an aqueous antifouling composition which contains no or little solvent and whereby an antifouling property can be obtained even by room temperature treatment, and durability of the antifouling property is excellent.

To accomplish the above object, the present invention provides an aqueous antifouling composition comprising fine particles of a copolymer which comprises the following polymer units (a), (b) and (c) and which has a glass transition temperature of at most 5° C., and an aqueous medium in which the fine particles are dispersed:

(a) polymer units of a (meth)acrylate having a polyfluoroalkyl group, (b) polymer units of an alkyl acrylate wherein the carbon number of the alkyl group is from 2 to 12, and (c) polymer units of a (meth)acrylic monoester of a polyol.

Further, the present invention provides the above aqueous antifouling composition, wherein the copolymer comprises the polymer units (a), (b) and (c), and polymer units (d) which are different from any of the polymer units (a), (b) and (c).

Still further, the present invention provides the above aqueous antifouling composition, which further contains an emulsifier.

The present invention also provides a process for producing an aqueous antifouling composition, which comprises copolymerizing at least three monomers which comprise the following monomers (a), (b) and (c) as essential components and whereby the glass transition temperature of a copolymer obtainable is at most 5° C., in an aqueous medium in the presence of an emulsifier, and diluting a dispersion thereby obtained:

(a) a (meth)acrylate having a polyfluoroalkyl group, (b) an alkyl acrylate wherein the carbon number of the alkyl group is from 2 to 12, and (c) a (meth)acrylic monoester of a polyol.

Further, the present invention provides the above process wherein at least four monomers which comprise the monomers (a), (b) and (c) and a monomer (d) which is different from any one of the monomers (a), (b) and (c), are copolymerized.

The present invention further provides an antifouling method which comprises applying the above-mentioned aqueous antifouling composition to a substrate, followed by drying at room temperature.

Still further, the present invention provides a product treated by the above-mentioned antifouling method.

According to the present invention, it is possible to impart an excellent antifouling property to a substrate by applying the antifouling composition to the substrate, followed by drying at room temperature. Further, the antifouling property is long lasting or durable, such that the antifouling property will not substantially decrease by e.g. abrasion during the use or will rarely be lowered by washing or dry cleaning.

Now, the present invention will be described in detail with reference to the preferred embodiments. Firstly, the copolymer used in the present invention and its polymer units (a), (b), (c) and (d) will be described.

In the following description, a polyfluoroalkyl group will be represented by "a $R^f$ group". Further, as described above, the monomers corresponding to the polymer units (a) to (d) will be represented by monomers (a) to (d), respectively.

The specific copolymer used in the present invention is a polymer having a glass transition temperature of at most 5° C. With a copolymer having a glass transition temperature exceeding 5° C., the object of the present invention can not be accomplished even if it contains the polymer units (a) to (c) or similar polymer units. Namely, even if antifouling composition containing a copolymer having a glass transition temperature exceeding 5° C., is applied to a substrate and dried at room temperature, a coating film of the copolymer can hardly be formed on the substrate surface. Even if a coating film is formed, the bond strength between the coating film and the substrate tends to be inadequate, and the durability of the antifouling property tends to be poor.

The glass transition temperature of the copolymer can be adjusted to a level of at most 5° C. by adjusting the proportions and types of the polymer units. For example, if polymer units of an alkyl methacrylate are contained in a relatively large amount instead of polymer units (b), a copolymer tends to have a glass transition temperature exceeding 5° C. Even with polymer units of an alkyl acrylate, if the carbon number of the alkyl group is large, the copolymer likewise tends to have a glass transition temperature exceeding 5° C.

In the present invention, the polymer units (b) do not include the polymer units (a), and the polymer units (c) do not include the polymer units (a) or a polymer units (b). Likewise, the monomer (b) does not include the monomer (a), and the monomer (c) does not include the monomer (a) or the monomer (b).

The polymer units (a) are polymer units of a (meth)acrylate having a $R^f$ group. The (meth)acrylate having a $R^f$ group is a compound wherein the $R^f$ group is present in the alcohol residue moiety of the (meth)acrylate.

The $R^f$ group is a group having at least two hydrogen atoms of an alkyl group substituted by fluorine atoms. The carbon number of the $R^f$ group is preferably from 2 to 20, more preferably from 6 to 16. The $R^f$ group is preferably a straight chain or branched group. In the case of a branched group, the branched moiety is preferably present at the terminal portion of the $R^f$ group and preferably a short chain having from 1 to 4 carbon atoms. The $R^f$ group may contain other halogen atoms in addition to fluorine atoms. As such other halogen atoms, chlorine atoms are preferred. Further, an etheric oxygen atom may be inserted between carbon atoms in the $R^f$ group.

The number of the fluorine atoms in the $R^f$ group is preferably at least 60%, more preferably at least 80%, as represented by [(the number of fluorine atoms in the $R^f$ group)/(the number of hydrogen atoms contained in an alkyl group having the same carbon number as the $R^f$ group)]×100 (%). Further, the $R^f$ group is preferably a group having all of hydrogen atoms of an alkyl group substituted by fluorine atoms (i.e. a perfluoroalkyl group).

Number of carbon atoms in the perfluoroalkyl group is preferably from 2 to 20, more preferably from 6 to 16. If the carbon number is less than 2, the water repellency and oil repellency of the antifouling composition tend to be low. On the other hand, if it exceeds 20, the (meth)acrylate having a perfluoroalkyl group tends to be solid at room temperature and tends to readily sublime, whereby its handling tends to be difficult.

The monomer (a) i.e. the (meth)acrylate having a $R^f$ group, is preferably a compound represented by the following Formula 1. In the Formula 1, $R^f$ represents a $R^f$ group, Q represents a bivalent organic group, and R is a hydrogen atom or a methyl group. As the $R^f$ group, those disclosed in the following specific examples and Examples are preferred.

$$R^f\text{—}Q\text{—}OCOCR\text{=}CH_2 \quad (1)$$

Q is preferably, for example, $-(CH_2)_{p+q}-$, $-(CH_2)_pCONH(CH_2)_q-$, $-(CH_2)_pOCONH(CH_2)_q-$, $-(CH_2)_pSO_2NR'(CH_2)_q-$, $-(CH_2)_pNHCONH(CH_2)_q-$ or $-(CH_2)_pCH(OH)-(CH_2)_q-$, wherein R' is a hydrogen atom or an alkyl group, and each of p and q is an integer of at least 0, provided that p+q is an integer of from 1 to 22. It is preferred that Q is $-(CH_2)_{p+q}-$, $-(CH_2)_pCONH(CH_2)_q-$ or $-(CH_2)_pSO_2NR'(CH_2)_q-$, wherein q is an integer of at least 2, and p+q is from 2 to 6. Particularly preferred is $-(CH_2)_{p+q}-$, wherein p+q is from 2 to 6, i.e. from an ethylene group to a hexamethylene group. It is preferred that fluorine atoms are bonded to the carbon atom of $R^f$ bonded to Q.

Specific examples of the (meth)acrylate having a $R^f$ group will be given below. In these examples, R represents a hydrogen atom or a methyl group, and $i\text{-}C_3F_7$ represents a perfluoroisopropyl group $[(CF_3)_2CF\text{-}]$.

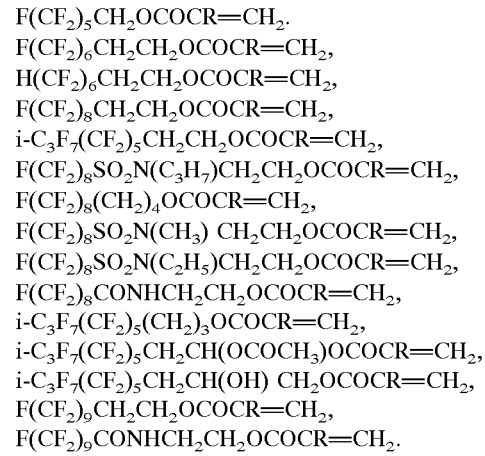

$F(CF_2)_5CH_2OCOCR\text{=}CH_2$.
$F(CF_2)_6CH_2CH_2OCOCR\text{=}CH_2$,
$H(CF_2)_6CH_2CH_2OCOCR\text{=}CH_2$,
$F(CF_2)_8CH_2CH_2OCOCR\text{=}CH_2$,
$i\text{-}C_3F_7(CF_2)_5CH_2CH_2OCOCR\text{=}CH_2$,
$F(CF_2)_8SO_2N(C_3H_7)CH_2CH_2OCOCR\text{=}CH_2$,
$F(CF_2)_8(CH_2)_4OCOCR\text{=}CH_2$,
$F(CF_2)_8SO_2N(CH_3)CH_2CH_2OCOCR\text{=}CH_2$,
$F(CF_2)_8SO_2N(C_2H_5)CH_2CH_2OCOCR\text{=}CH_2$,
$F(CF_2)_8CONHCH_2CH_2OCOCR\text{=}CH_2$,
$i\text{-}C_3F_7(CF_2)_5(CH_2)_3OCOCR\text{=}CH_2$,
$i\text{-}C_3F_7(CF_2)_5CH_2CH(OCOCH_3)OCOCR\text{=}CH_2$,
$i\text{-}C_3F_7(CF_2)_5CH_2CH(OH)\,CH_2OCOCR\text{=}CH_2$,
$F(CF_2)_9CH_2CH_2OCOCR\text{=}CH_2$,
$F(CF_2)_9CONHCH_2CH_2OCOCR\text{=}CH_2$.

The copolymer of the present invention may contain more than one types of polymer units (a). When more than one types of polymer units (a) are contained, they are preferably a mixture of (meth)acrylates having $R^f$ groups with different carbon numbers.

The polymer units (b) are polymer units of an alkyl acrylate wherein the carbon number of the alkyl group is from 2 to 12. If the carbon number of the alkyl group is larger or smaller than this range, the glass transition temperature of the copolymer tends to exceed 5° C. The alkyl group may be a linear alkyl group or a branched alkyl group. The linear alkyl group is preferably a $C_{4\text{-}10}$ linear alkyl group. The branched alkyl group is preferably a $C_{3\text{-}12}$ branched alkyl group having a $C_{2\text{-}8}$ main chain moiety and a $C_{1\text{-}4}$ side chain moiety. A particularly preferred alkyl group is a $C_{4\text{-}10}$ linear or branched alkyl group. The alkyl acrylate as the monomer (b) is preferably, for example, ethyl acrylate, propyl acrylate, isopropyl acrylate, butyl acrylate, sec-butyl acrylate, isobutyl acrylate, 2-ethylhexyl acrylate, octyl acrylate, decyl acrylate or dodecyl acrylate. Particularly preferred is butyl acrylate, octyl acrylate or 2-ethylhexyl acrylate. Further, the copolymer in the present invention may contain more than one types of polymer units (b).

The polymer units (c) are polymer units of a (meth)acrylic monoester of a polyol. The polyol is preferably a polyol having from 2 to 8 hydroxyl groups and may be a polyol having repeating units, such as a polyoxyalkylene polyol or a polyester polyol. The polymer units (c) have at least one hydroxyl group, and the copolymer has such hydroxyl groups, whereby an adequate adhesion to the substrate is obtainable even when the copolymer is brought in contact with the substrate at room temperature. The copolymer in the present invention may contain more than one types of polymer units (c).

A preferred polyol is a diol. Among them, particularly preferred is a diol selected from an alkane diol, a bis (hydroxyalkyl)ether, a polyoxyalkylene diol and a polyester diol.

The alkane diol is preferably a $C_{2\text{-}12}$ alkane diol, more preferably a $C_{2\text{-}8}$ alkane diol. The alkane diol may sometimes be represented as an alkylene glycol. Further, the alkane diol may be a chlorine-containing alkane diol having some hydrogen atoms substituted by chlorine atoms. Specific examples of preferred alkane diols will be given below.

Ethylene glycol, propylene glycol, neopentyl glycol, 1,4-butanediol, 1,6-hexanediol, 3-chloro-1,2-propanol, etc.

The two hydroxyalkyl groups in the bis(hydroxyalkyl) ether may have different carbon numbers as in e.g. $HOCH_2CH_2OH_2CH(CH_3)OH$, but they are usually preferably have the same carbon number. The bis(hydroxyalkyl) ether in which the two hydroxyalkyl groups have the same carbon number, may have at least three carbon atoms between oxygen atoms, like e.g. $HO(CH_2)_3O(CH_2)_3OH$, but it usually preferably has two carbon atoms between oxygen atoms like e.g. $HO(CH_2)_2O(CH_2)_2OH$. Further, the bis (hydroxyalkyl)ether may be a chlorine-containing bis (hydroxyalkyl)ether having some hydrogen atoms substituted by chlorine atoms. A preferred bis(hydroxyalkyl)ether may, for example, be diethylene glycol or dipropylene glycol.

The polyoxyalkylene diol may, for example, be a polyoxyalkylene diol wherein the number of oxyalkylene units is at least 3, preferably from 3 to 20. The oxyalkylene units in the polyoxyalkylene diol may be the same or different. $C_{2-4}$ oxyalkylene units are preferred, and oxyethylene units and/ or oxypropylene units and/or oxybutylene units, are particularly preferred.

A preferred polyoxyalkylene diol may, for example, be a polyoxyethylene diol wherein the number of oxyethylene units is from 3 to 20, a polyoxypropylene diol wherein the number of oxypropylene units is from 3 to 20, polyoxybutylene diol wherein the number of oxybutylene groups is from 3 to 20, (oxypropyleneoxyethylene)diol wherein the number of oxyalkylene units is from 3 to 20 or a poly (oxypropyleneoxybutylene)diol wherein the number of oxyalkylene units is from 3 to 20.

The polyester diol may, for example, be a polyester diol having at least two, preferably from 2 to 50, ester units which are formed by dehydration condensation of a dibasic acid and an alkane diol, or which are formed by ring opening of a cyclic ester. The ester units in the polyester diol may be more than one types. For example, the polyester diol may have units formed by dehydration condensation of more than one types of dibasic acids and more than one types of alkane diols, or may have ester units formed by ring opening of more than one types of cyclic esters. A preferred polyester diol is a polyester diol having at least two ester units formed by ring opening of a cyclic ester such as ε-caprolactone.

Specific examples of the (meth)acrylic monoester of a polyol as the monomer (c) include, for example, the following compounds.

2-hydroxyethyl (meth)acrylate, 2-hydroxypropyl (meth) acrylate, 4-hydroxybutyl (meth)acrylate, 6-hydroxyhexyl (meth)acrylate, diethylene glycol mono(meth)acrylate, dipropylene glycol mono(meth)acrylate and 3-chloro-2-hydroxypropyl (meth)acrylate.

A mono(meth)acrylate of a polyoxyalkylene diol having from 3 to 12 oxyalkylene units, which is obtainable by adding a cyclic ether such as ethylene oxide, propylene oxide, tetrahydrofuran or a mixture thereof, to a hydroxyalkyl (meth)acrylate such as the above-mentioned 2-hydroxyethyl (meth)acrylate. A mono(meth)acrylate of polyoxyethylene diol, a mono(meth)acrylate of polyoxypropylene diol, a mono(meth)acrylate of poly (oxypropyleneoxyethylene)diol, a mono(meth)acrylate of poly(oxyethyleneoxybutylene)diol, wherein the number of oxyalkylene units is from 3 to 12.

A mono(meth)acrylate of a polyester diol having from 2 to 50 ester units, which is obtained by ring opening addition of ε-caprolactone to a hydroxyalkyl (meth)acrylate such as the above-mentioned 2-hydroxyethyl (meth)acrylate, such as a mono(meth)acrylate of a poly(ε-caprolactone), wherein the number of ester units is from 2 to 50.

The copolymer in the present invention may contain polymer units (d) in addition to the above-mentioned polymer units (a), (b) and (c). The polymer units (d) are not particularly limited, so long as the corresponding monomer (d) is copolymerizable with monomers (a) to (c). However, in a case where polymer units (d) have a nature of raising the glass transition temperature of the copolymer, even if they are present in the copolymer, their amount is required to be small. A monomer for such polymer units, may, for example, be an alkyl (meth)acrylate wherein the number of carbon atoms in the alkyl group is large, as mentioned above, or a vinyl halide such as vinyl chloride.

The polymer units (d) may contain a functional group such as a hydroxyl group, an epoxy group or an amino group. When the polymer units (d) having such functional groups are present in the copolymer, adhesion of the copolymer to the substrate will be improved in the same manner as in the case of the above-mentioned polymer units (c). However, the polymer units (d) do not contain a functional group which provides its function under heating.

The polymer (d) includes, for example, the following compounds.

A vinyl carboxylate such as vinyl acetate, a (meth) acryloamide such as (meth)acryloamide, N-methylol (meth) acryloamide or diacetone (meth)acryloamide, an epoxy group-containing (meth)acrylate such as glycidyl (meth) acrylate, a styrene such as styrene or α-methylstyrene, or a (meth)acrylate of an alicyclic alcohol or an alcohol having an aromatic ring, such as cyclohexyl (meth)acrylate or benzyl (meth)acrylate.

The proportions of the polymer units (a), (b) and (c) in the copolymer are preferably from 50 to 98 wt % of the polymer units (a), from 1 to 49.8 wt % of the polymer units (b) and from 0.1 to 20 wt % of the polymer units (c), more preferably from 50 to 80 wt % of the polymer units (a), from 10 to 40 wt % of the polymer units (b) and from 1 to 15 wt % of the polymer units (c), most preferably from 60 to 75 wt % of the polymer units (a), from 15 to 35 wt % of the polymer units (b) and from 1 to 10 wt % of the polymer units (c).

When the copolymer contains the polymer units (d), the proportion of the polymer units (d) in the copolymer is preferably from 0.1 to 20 wt %, more preferably from 0.5 to 10 wt %.

If the proportion of the polymer units (a) is small, the antifouling property tends to be inadequate. If the proportion of the polymer units (b) is small, the glass transition temperature tends to exceed 5° C., and the film-forming property at room temperature tends to be inadequate, and the antifouling property and durability tend to be inadequate. If the proportion of the polymer units (c) is small, the durability tends to be inadequate. Thus, it is important that the compositional proportions of the respective polymer units are within the above-mentioned ranges.

The molecular weight of the copolymer in the present invention is not particularly limited, but it is usually from 5,000 to 500,000, preferably from 10,000 to 100,000.

The aqueous antifouling composition of the present invention is a composition wherein fine particles of the above copolymer are dispersed in an aqueous medium in a stabilized state. In order to disperse the fine particles of the copolymer in the aqueous medium in a stabilized state, it is preferred that this composition further contains a surfactant. This surfactant may be different or the same as the surfactant (hereinafter sometimes referred to also as an emulsifier) to be used for the preparation of the copolymer by emulsion polymerization as described hereinafter. Otherwise, to a composition containing an emulsifier, a surfactant which is different or the same as the emulsifier, may be added anew. The amount of the surfactant including the emulsifier is usually from 0.1 to 30 parts by weight, preferably from 0.5 to 20 parts by weight, per 100 parts by weight of the copolymer. If the amount of the surfactant is too small, the dispersion stability of the copolymer tends to deteriorate. On the other hand, if it is too much, the antifouling property tends to deteriorate, and when a dyed cloth or the like is treated therewith, the color fading is likely to result. Accordingly, it is advisable to select the amount of the surfactant within the above-mentioned range.

The average particle size of the fine particles of the copolymer is preferably from 0.001 to 5 μm, more preferably from 0.01 to 1 μm. If the average particle size is too small, a large amount of the surfactant will be required to obtain a stable dispersion, and the above-mentioned problems are likely to be brought about. If the average particle size is too large, the dispersion stability tends to be low. The average particle size can be measured by a dynamic light scattering apparatus or an electron microscope.

The aqueous medium may be a medium composed solely of water containing substantially no solvent, or a mixed solvent comprising water and a water-soluble amount of an water-soluble organic solvent. The amount of the water-soluble organic solvent is not more than the solubility in water and is preferably at most 20 wt %, based on the mixture with water. The aqueous antifouling composition of the present invention may be a concentrated liquid having a high concentration of the copolymer, and in such a case, when a substrate is to be treated, the composition is diluted with an aqueous medium before use. In the form of the concentrated liquid, the amount of the water-soluble organic solvent in the aqueous medium may be at a relatively high concentration, but at the time of the actual treatment, the amount of the water-soluble organic solvent is preferably at most 10 wt %, more preferably at most 5 wt %, based on the mixture with water.

The water-soluble organic solvent is preferably a water-soluble organic solvent of glycol type, ester type, ketone type or ether type. Its boiling point is preferably from 50 to 250° C., more preferably from 80 to 200° C.

The water-soluble organic solvent may, for example, be the following solvents.

Acetone, ethylene glycol monoethyl ether acetate, ethylene glycol monoethyl ether, ethylene glycol monomethyl ether, ethylene glycol monobutyl ether, propylene glycol monomethyl ether, propylene glycol monomethyl ether acetate, dipropylene glycol monomethyl ether, tripropylene glycol monomethyl ether, propylene glycol butyl ether, ethyl 3-ethoxypropionate, 3-methoxy-3-methyl-1-butanol, 2-tert-butoxyethanol, isopropylalcohol, butanol, isobutylalcohol, ethanol, ethylene glycol, propylene glycol, dipropylene glycol or tripropylene glycol.

The concentration of the copolymer in the aqueous antifouling composition of the present invention is not particularly limited. Usually, in a composition which is used for treating a substrate, the concentration of the copolymer is preferably at most 10 wt %, more preferably at most 5 wt %. The lower limit may vary depending upon the purpose, but is usually about 0.01 wt %. Thus, the concentration of the copolymer is low in the composition to be used for the treatment of a substrate. However, in the composition as produced, or to in the form of a commercial product, the concentration of the copolymer may be high. Such a composition containing a high concentration of the copolymer is diluted with e.g. water when it is to be practically used. The upper limit of the concentration of the copolymer in such a composition containing a high concentration of the copolymer may be as high as 50 wt %. Usually, however, it is preferably at most 40 wt %.

The process for producing the aqueous antifouling composition of the present invention is not particularly limited. The copolymer to be used in the present invention is produced usually by a method such as emulsion polymerization, solution polymerization or suspension polymerization. By the emulsion polymerization, a composition substantially the same as the aqueous antifouling composition of the present invention, can be obtained. Namely, by copolymerizing at least three monomers which comprise the above-mentioned monomers (a), (b) and (c) and whereby the glass transition temperature of a copolymer obtainable will be at most 5° C., in the above-mentioned aqueous medium in the presence of an emulsifier, an aqueous composition having fine particles of the copolymer dispersed in the aqueous medium in a stabilized state, can be obtained. In the case of the solution polymerization, the obtained copolymer solution may be dispersed in an aqueous medium, and the polymerization medium may be removed, to obtain an aqueous composition. In the case of the suspension polymerization, the obtained copolymer is dissolved in a solvent, and the solution is dispersed in an aqueous medium, followed by removal of the solvent, to obtain an aqueous composition. A preferred process is a process wherein the copolymer is produced by emulsion polymerization, and by using the copolymer, the aqueous antifouling composition of the present invention is produced. Now, the emulsion polymerization will be described.

As the emulsion polymerization method, a method is preferred in which the above-mentioned monomers are polymerized in the presence of an emulsifier, a polymerization initiator and a polymerization medium. Particularly preferred is a method wherein the monomers, an emulsifier and a polymerization medium are mixed to emulsify the monomers in the polymerization medium, then a polymerization initiator is added thereto, followed by heating and stirring for polymerization. As a method for emulsification, it is advisable to employ a method which is cable of imparting a high level of dispersion stability to the emulsified product by means of e.g. a homomixer or a high pressure homogenizer. By improving the dispersion of the monomers, it is possible to improve the yield of the copolymer.

The polymerization medium is preferably an aqueous medium as described above. In such a case, it is preferred to employ an aqueous medium having a relatively high content of a water-soluble organic solvent from the viewpoint of the polymerizability or the dispersion stability of fine particles of the resulting copolymer. It is also possible to use an aqueous medium containing a water-soluble organic solvent in an amount larger than the above-mentioned amount. Further, it is possible to use a water-soluble organic solvent having a low boiling point and to remove the water-soluble organic solvent after the polymerization. The amount of the water-soluble organic solvent in the aqueous medium to be used as the polymerization medium, is preferably from 1 to 30 wt %, more preferably from 5 to 20 wt %.

The emulsifier is not particularly limited, and a surfactant of nonionic type, cationic type, anionic type or amphoteric type may be used. A cationic emulsifier is preferred. It is particularly preferred to use cationic and nonionic emulsifiers in combination. The amount of the emulsifier is preferably from 0.5 to 30 parts by weight per 100 parts by weight of the monomers, and particularly preferably, the amount of the emulsifier is from 1 to 15 parts by weight per 100 parts by weight of the monomers, from the viewpoint of the performance required for the above-mentioned aqueous antifouling composition.

Now, specific examples of the emulsifier will be given below, but useful emulsifiers are not limited thereto. In the following examples of the emulsifier, the alkyl group moiety such as an octadecyl group, may be replaced by an alkenyl group moiety such as an oleyl group.

The nonionic emulsifier may, for example, be an alkylphenylpolyoxyethylene, an alkylpolyoxyethylene, an alkylpolyoxyalkylenepolyoxyethylene, a fatty acid ester, an alkylaminepolyoxyethylene, an alkylamidepolyoxyethylene, an alkylaminepoly (oxyethyleneoxypropylene), or an alkylamineoxide.

The alkylphenylpolyoxyethylene may, for example, be nonylphenylpolyoxyethylene or octylphenylpolyoxyethylene.

The alkylpolyoxyethylene may be one wherein the alkyl group is a $C_{4-26}$ saturated aliphatic group which may be linear or branched. Specific examples of such an alkyl group include an octyl group, a dodecyl group, a tetradecyl group, a hexadecyl group, an octadecyl group, a behenyl group and a secondary alkyl group.

The alkylpolyoxyalkylenepolyoxyethylene may, for example, be an alkylpolyoxypropylenepolyoxyethylene or an alkylpolyoxybutylenepolyoxyethylene, wherein the alkyl moiety may be a $C_{4-26}$ saturated aliphatic group which may be linear or branched. Specific examples of such an alkyl moiety include an octyl group, a dodecyl group, a tetradecyl group, a hexadecyl group, an octadecyl group, a behenyl group and a secondary alkyl group.

The cationic emulsifier may, for example, be an amine salt, a quaternary ammonium salt, an oxyethylene addition type ammonium hydrochloride. Specifically, a trimethylalkylammoniuim hydroxide, a dimethyldialkylammonium hydroxide, a monoalkylamineacetate or an alkylmethyldipolyoxyethyleneammonium hydrochloride may, for example, be mentioned. The alkyl group may, for example, be a $C_{4-26}$ saturated aliphatic group, such as an octyl group, a dodecyl group, a tetradecyl group, a hexadecyl group, an octadecyl group or a behenyl group.

The anionic surfactant may, for example, be a fatty acid salt, an α-olefin sulfonate, an alkylbenzene sulfonate or its salt, an alkyl sulfate, an alkylether sulfate, an alkylphenylether sulfate ester, a methyltaurine salt, or an alkyl sulfosuccinate.

The amphoteric emulsifier may, for example, be alanines, imidazolinium betaines, amide betaines, or betaine acetate. Specifically, dodecyl betaine, octadecyl betaine, dodecylcarboxymethylhydroxyethylimidazolinium betaine, dodecyldimethylaminoacetate betaine or a fatty acid amidepropyldimethylaminoacetate betaine, may, for example, be mentioned.

The polymerization initiator is preferably a water-soluble or oil-soluble. Particularly preferred is a water-soluble polymerization initiator. A commonly employed initiator of e.g. azo type, peroxide type or redox type, may be used depending upon the polymerization temperature. Particularly preferred is a salt of an azo type compound.

The polymerization temperature is not particularly limited, but it is preferably from 20 to 155° C.

Further, for the purpose of controlling the molecular weight of the copolymer, polymerization may be carried out by means of a chain transfer agent. As a chain transfer agent, an aromatic compound or a mercaptan is preferred. Particularly preferred is an alkylmercaptan. Specifically, n-octylmercaptan, n-dodecylmercaptan, 2,4,6-trimethyl-2-nonanethiol, or n-octadecylmercaptan, may, for example, be mentioned. Further, α-methylstyrenedimer or the like, is also preferred.

The composition obtained by the above-mentioned emulsion polymerization may be used by itself as the aqueous antifouling composition of the present invention. Otherwise, purification such as removal of unreacted monomers, may be carried out. Further, the composition may be adjusted by adding a surfactant or by diluting with water or an aqueous medium, as mentioned above. Usually, the composition obtained by emulsion polymerization has a high concentration of the copolymer, and dilution is carried out. The diluted composition may be the above-mentioned concentrated liquid or a composition having a low concentration of the copolymer, to be used for the final application (for treatment of a substrate). Even if an aqueous medium containing a large amount of a water-soluble organic solvent, is used as the polymerization medium, it is possible to reduce the amount of the water-soluble organic solvent in the aqueous antifouling composition to be used for the final application, by dilution with water.

The aqueous antifouling composition of the present invention may contain additional components in addition to the above described components. As such additional components, other antifouling agents, a water repellant, an oil repellant, a crosslinking agent, an insecticide, a flame-retardant, an antistatic agent or a crease-preventing agent may, for example, be mentioned.

The aqueous antifouling composition of the present invention may be applied to a substrate by a conventional method, depending upon the type of the substrate. For example, a method may be employed wherein it is applied to the surface of a substrate by a coating method such as dip coating or spraying, followed by drying. The drying can be carried out at room temperature, and adequate antifouling property and durability can be obtained by drying at room temperature. However, adequate antifouling property and durability can be obtained also by heat drying. In the case of room temperature drying, the drying time tends to be long as compared with the heat drying, but adequate performance can be obtained by room temperature drying within 24 hours, particularly within 12 hours. The thickness of the coating film)of the copolymer formed on the substrate surface by the aqueous antifouling composition of the present invention, is usually from 0.05 to 0.5 $\mu$m, and adequate performance can be obtained with that thickness. As the substrate to be treated with the antifouling composition of the present invention, a fiber product made of e.g. natural fibers, synthetic fibers or mixed fibers thereof, may be mentioned. Specifically, a clothing, a carpet or an interior product may, for example, be mentioned. Further, the antifouling treatment can be applied also to an article made of such a material as metal, glass or resin, other than the fiber product.

Now, the present invention will be described in further detail with reference to Examples. However, it should be understood that the present invention is by no means restricted by such specific Examples.

Examples 1 to 7 and 10 are Working Examples of the present invention, and Examples 8 and 9 are Comparative Examples. Further, the compounds used in these Examples are as follows.

FA: $C_mF_{2m+1}CH_2CH_2OCOCH=CH_2$ (m is 6, 8, 10, 12, 14 or 16, the average being 9), EHA: 2-ethylhexyl acrylate, BuA: n-butyl acrylate, DEA: decyl acrylate, HYA: hexyl acrylate, StA: octadecyl acrylate, HEA: 2-hydroxyethyl acrylate, HEMA: 2-hydroxyethyl methacrylate, PPMA: polyoxypropylenediol monomethacrylate obtained by adding 9 mols of propylene oxide to 1 mol of 2-hydroxyethyl methacrylate, PEMA: polyoxyethylenediol monomethacrylate obtained by adding 9 mols of ethylene oxide to 1 mol of 2-hydroxyethyl methacrylate, CHM: 3-chloro-2-hydroxypropyl methacrylate, MAM: N-methylolacrylamide, GMA: glycidyl methacrylate, PCA: 10 mol ε-caprolactone adduct of 4-hydroxybutyl acrylate $[CH_2=CHCOO(CH_2)_4O(CO(CH_2)_5O)_{10}H]$, NP: nonylphenylpolyoxyethylene, AA: long chain alkyltrimethylammonium chloride (carbon number of the long chain alkyl group being from 16 to 18).

EXAMPLE 1

Into a 1 l glass container, 140 g (70 parts) of FA, 56 g (28 parts) of EHA, 4 g (2 parts) of HEA, 0.6 g of n-dodecylmercaptan, as emulsifiers 14 g of NP and 2 g of AA, 292 g of water, and 32 g of propylene glycol, were charged and preliminarily dispersed by a homogenizer, and then emulsified at 200 kg/cm² by means of a high pressure homogenizer (emulsifying machine, manufactured by Gouline company), to obtain an emulsion.

This emulsion was charged into a 1 l stainless steel autoclave, which was then flushed with nitrogen. Then, 0.6 g of "VA-061" (disulfate as an azo type polymerization initiator, manufactured by Wako Jyunyaku K.K.) was added thereto, and after raising the temperature to 55° C., the mixture was polymerized for 15 hours to obtain 520 g of a copolymer dispersion containing 37.0 wt % of a copolymer (solid content) having an average particle size of 0.10 μm. The measurement of the average particle size was carried out by a laser system light scattering method by means of a dynamic light-scattering apparatus (manufactured by Otsuka Denshi K.K.).

Water added to the copolymer dispersion to adjust the solid content concentration to 20 wt % to obtain a latex stock liquid. To 12 g of this stock liquid, 288 g of water was further added to prepare a latex treating liquid for evaluation.

As a test cloth, a polyester/cotton mixed cloth (weight ratio: 65/35) was prepared, and it was dipped in the latex treating liquid and then squeezed between a pair of rubber rollers to a wet pickup of 70 wt %. Then, it was dried at room temperature for 24 hours. The obtained test cloth was evaluated by the following methods.

Evaluation of Water Repellency

An aqueous solution of isopropylalcohol (IPA) as shown in Table 1, was put on the test cloth, and the water repellency was evaluated in accordance with AATCC-TM118-1966 and represented by the water repellency grade as shown in Table 1. Symbol + (−) for the water repellency grade indicates that the performance in question is slightly better (poor).

TABLE 1

| Water repellency grade | Test liquid (wt %) |
|---|---|
| 12 | IPA |
| 11 | IPA 90/Water 10 |
| 10 | IPA 80/Water 20 |
| 9 | IPA 70/Water 30 |
| 8 | IPA 60/Water 40 |
| 7 | IPA 50/Water 50 |
| 6 | IPA 40/Water 60 |
| 5 | IPA 30/Water 70 |
| 4 | IPA 20/Water 80 |
| 3 | IPA 10/Water 90 |
| 2 | IPA 5/Water 95 |
| 1 | IPA 2/Water 98 |
| 0 | Less than 1 |

Evaluation of Oil Repellency

In accordance with AATCC-TM118-1966, a few drops (diameter: 4 mm) of a test liquid as shown in Table 2, were put at two portions of the test cloth, and the oil repellency was evaluated by the penetration of the test liquid after 30 seconds and represented by the oil repellency grade as identified in Table 2. Symbol + (−) for the oil repellency grade indicates that the performance in question is slightly better (poor).

TABLE 2

| Oil repellency grade | Test liquid | Surface tension (dyn/cm) at 25° C. |
|---|---|---|
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | 65 parts of nujol/ 35 parts of hexadecane | 29.6 |
| 1 | nujol | 31.2 |
| 0 | Less than 1 | — |

Test on Washing Durability

The test on washing durability (referred to as HL20) of a test cloth was carried out in such a manner that washing by a washing method in accordance with JIS L0217 Separate Table 103 was repeated 20 times, and after drying in air, the above mentioned evaluations of water repellency and oil repellency were carried out. The results are shown in Table 4.

EXAMPLES 2 to 10

Using the monomers as identified in Table 3, copolymerization was carried out in the same manner as in Example 1 to obtain a dispersion of a copolymer. The properties of the copolymer in the dispersion are shown in Table 3. Using the dispersion of the copolymer, a latex treating liquid was prepared, and the evaluation tests were carried out in the same manner as in Example 1. The results are shown in Table 4.

TABLE 3

| Example No. | Composition of monomers (wt %) | Solid content (%) | Average particle size (μm) | Glass transition temperature (° C.) |
|---|---|---|---|---|
| 1 | FA/EHA/HEA = 70/28/2 | 37.0 | 0.10 | −5 |
| 2 | FA/EHA/MAM/HEMA = 65/25/8/2 | 36.8 | 0.11 | 0 |
| 3 | FA/EHA/PPMA/GMA = 65/25/8/2 | 37.2 | 0.11 | −5 |
| 4 | FA/BuA/PEMA = 73/19/8 | 37.2 | 0.12 | 0 |
| 5 | FA/DEA/HEMA = 65/30/5 | 37.0 | 0.10 | 0 |
| 6 | FA/HYA/PPMA = 60/35/5 | 37.2 | 0.11 | 0 |
| 7 | FA/BuA/CHM = 71/24/5 | 36.9 | 0.11 | −10 |
| 8 | FA/EHA = 70/30 | 36.9 | 0.11 | −15 |
| 9 | FA/StA/CHM = 71/24/5 | 36.9 | 0.11 | 45 |
| 10 | FA/EHA/PCA = 70/28/2 | 36.8 | 0.13 | −10 |

TABLE 4

| | Water repellency | | Oil repellency | |
|---|---|---|---|---|
| Example No. | Before washing | HL20 | Before washing | HL20 |
| 1 | 10 | 9 | 6 | 5 |
| 2 | 9 | 8 | 6− | 5 |
| 3 | 10 | 9 | 6 | 5 |
| 4 | 10− | 9 | 6 | 5− |
| 5 | 10 | 9 | 6 | 5 |
| 6 | 10 | 9 | 6 | 5 |
| 7 | 10 | 9 | 6 | 5 |
| 8 | 6 | 1 | 3+ | 0 |
| 9 | 0 | 0 | 0 | 0 |
| 10 | 10 | 9 | 6 | 5 |

The antifouling composition of the present invention has high grades of water repellency and oil repellency, and after repeating washing many times, the decrease in such grades is at a level of one grade, thus indicating good durability.

The antifouling composition of the present invention can be dried at room temperature and provides a good antifouling property after drying at room temperature, whereby the durability of the antifouling property is remarkably good. Further, it is a water-dispersible and thus is free from problems such as destruction of the ozone layer, a bad odor, inflammability or necessity for disposal treatment of a solvent.

What is claimed is:

1. An aqueous antifouling composition comprising fine particles of a copolymer which comprises the following polymer units (a), (b) and (c) and which has a glass transition temperature of at most 5° C., and an aqueous medium in which the fine particles are dispersed:

(a) polymer units of a (meth)acrylate having a polyfluoroalkyl group, (b) polymer units of an alkyl acrylate wherein the carbon number of the alkyl group is from 2 to 12, and (c) polymer units of a (meth)acrylic monoester of a polyol.

2. The aqueous antifouling composition according to claim 1, wherein the copolymer comprises from 50 to 98 wt % of the polymer units (a), from 1 to 49.8 wt % of the polymer units (b) and from 0.1 to 20 wt % of the polymer units (c).

3. The aqueous antifouling composition according to claim 1, wherein the copolymer comprises the polymer units (a), (b) and (c), and polymer units (d) which are different from any of the polymer units (a), (b) and (c).

4. The aqueous antifouling composition according to claim 3, wherein the copolymer comprises from 50 to 98 wt % of the polymer units (a), from 1 to 49.8 wt % of the polymer units (b), from 0.1 to 20 wt % of the polymer units (c) and from 0.1 to 20 wt % of the polymer units (d).

5. The aqueous antifouling composition according to claim 1, wherein the polymer units (c) are polymer units of a (meth)acrylic monoester of a diol selected from the group consisting of an alkane diol, a bis(hydroxyalkyl) ether and a polyoxyalkylene diol.

6. The aqueous antifouling composition according to claim 1, which further contains an emulsifier.

7. A process for producing an aqueous antifouling composition, which comprises copolymerizing at least three monomers (a), (b) and (c) to produce a copolymer having a glass transition temperature of at most 5° C., in an aqueous medium in the presence of an emulsifier:

(a) a (meth) acrylate having a polyfluoroalkyl group, (b) an alkyl acrylate wherein the carbon number of the alkyl group is from 2 to 12, and (c) a (meth) acrylic monoester of a polyol.

8. A process for producing an aqueous antifouling composition, which comprises copolymerizing at least three monomers (a), (b) and (c) to produce a copolymer having a glass transition temperature of at most 5° C., in an aqueous medium in the presence of an emulsifier, and diluting a dispersion thereby obtained:

(a) a (meth) acrylate having a polyfluoroalkyl group, (b) an alkyl acrylate wherein the carbon number of the alkyl group is from 2 to 12, and (c) a (meth) acrylic monoester of a polyol.

9. The process according to claim 7, wherein at least four monomers which comprise the monomers (a), (b) and (c) and a monomer (d) which is different from any one of the monomers (a), (b) and (c), are copolymerized.

10. An antifouling method which comprises applying the aqueous antifouling composition as defined in claim 1 to a substrate, followed by drying at room temperature.

11. A product treated by the method as defined in claim 10.

* * * * *